(12) United States Patent
Kumar et al.

(10) Patent No.: US 11,582,145 B1
(45) Date of Patent: Feb. 14, 2023

(54) ON-DEMAND OPTICAL NEXT-HOP WITH OPTICAL PROVISIONING SEGMENT ROUTING (SR) LABEL

(71) Applicant: Cisco Technology, Inc., San Jose, CA (US)

(72) Inventors: Praveen Kumar, Karnataka (IN); Navdeep Sood, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/467,595

(22) Filed: Sep. 7, 2021

(51) Int. Cl.
*H04L 45/02* (2022.01)
*H04L 45/24* (2022.01)
*H04L 45/00* (2022.01)
*H04L 45/42* (2022.01)

(52) U.S. Cl.
CPC .............. *H04L 45/24* (2013.01); *H04L 45/02* (2013.01); *H04L 45/42* (2013.01); *H04L 45/566* (2013.01)

(58) Field of Classification Search
CPC ......... H04L 45/24; H04L 45/02; H04L 45/42; H04L 45/566
USPC ........................................................ 709/238
See application file for complete search history.

(56) References Cited

U.S. PATENT DOCUMENTS

| | | | |
|---|---|---|---|
| 2004/0193728 A1* | 9/2004 | Doshi | H04L 41/0663 709/238 |
| 2009/0161681 A1* | 6/2009 | Madrahalli | H04Q 11/0062 370/401 |
| 2009/0324222 A1* | 12/2009 | Kunjidhapatham | H04L 45/22 398/58 |
| 2011/0188857 A1* | 8/2011 | Zheng | H04L 12/6418 398/45 |
| 2012/0099861 A1* | 4/2012 | Zheng | H04Q 11/0067 398/45 |
| 2012/0127854 A1* | 5/2012 | Khetan | H04L 49/557 370/218 |
| 2014/0195666 A1* | 7/2014 | Dumitriu | H04L 43/55 709/223 |
| 2015/0146536 A1* | 5/2015 | Minei | H04L 45/507 370/236 |

(Continued)

FOREIGN PATENT DOCUMENTS

| | | |
|---|---|---|
| EP | 3247062 A1 | 11/2017 |
| WO | 2021/008497 A1 | 1/2021 |

OTHER PUBLICATIONS

Psenak, et al., "RFC 8665—OSPF Extensions for Segment Routing," Internet Engineering Task Force (IETF), Standards Track, Dec. 2019, 25 pages.

(Continued)

*Primary Examiner* — Anthony Mejia
(74) *Attorney, Agent, or Firm* — Edell, Shapiro & Finnan, LLC (57) ABSTRACT

Presented herein are techniques for dynamic optical network programming using Segment Routing (SR) using an Optical Provisioning SR Label (OPSL). In one form, a method is provided that is performed by a network element that has received an OPSL from another network element to create an optical circuit. In another form, a method is provided that is performed by a network element that sends an OPSL to another network element to cause that other network element to create an optical circuit.

20 Claims, 9 Drawing Sheets

(56) References Cited

U.S. PATENT DOCUMENTS

| | | | |
|---|---|---|---|
| 2015/0200838 A1* | 7/2015 | Nadeau | H04L 45/02 370/254 |
| 2017/0230276 A1 | 8/2017 | Ceccarelli et al. | |
| 2017/0257684 A1 | 9/2017 | Anand et al. | |
| 2019/0356600 A1 | 11/2019 | Barton et al. | |
| 2021/0258665 A1* | 8/2021 | Sadasivarao | H04L 63/0853 |

OTHER PUBLICATIONS

Previdi, et al., "RFC 8667—IS-IS Extensions for Segment Routing," Internet Engineering Task Force (IETF), Standards Track, Dec. 2019, 28 pages.
Viscardi, "Converging IP and Optical Networks," BRKOPT-2405, CISCO Live!, Jan. 2020, 59 pages.
Moura, et al., "Rethink your network—The intersection of Optical and Routing," BRKOPT-2002, CISCO Live!, Jun. 2019, 77 pages.
World Wide Technology, "Is Hop-by-Hop the Future of Optical Transport Networking?," https://www.wwt.com/article/is-hop-by-hop-the-future-of-optical-transport-networking/, Oct. 2020, 10 pages.

* cited by examiner

ON-DEMAND OPTICAL NEXT-HOP WITH OPTICAL PROVISIONING SEGMENT ROUTING (SR) LABEL

TECHNICAL FIELD

The present disclosure relates to packet optical networking.

BACKGROUND

Hop-by-Hop networking is the future of the converged optical and packet network. Traditionally, operators maintain optical and packet networks separately in isolation. Layer 3 protocols are usually unaware of the underlying optical network. Complex user network interface (UNI) signaling (UNI-C and UNI-N) is done for the optical circuit set up, but this can be an unnecessary overhead from a maintenance perspective. As the optical and packet networks are becoming converged, every router will understand the Layer 3/Multiprotocol Label Switching (L3/MPLS) label in the future (even optical devices). Routed optical networking (RON) is an upcoming network architecture that merges Internet Protocol (IP) and private line services onto a single layer in which all the switching is done at Layer 3. 400G coherent optics ZR/ZR+ is capable of carrying an optical signal at a long distance with the help of an optical amplifier. Currently, an optical circuit is set up in advance to steer the traffic (manually or with the help of optical binding Segment Identifier (SID)).

DESCRIPTION OF EXAMPLE EMBODIMENTS

Overview

Presented herein are techniques for dynamic optical network programming using Segment Routing (SR) using an Optical Provisioning SR Label (OPSL). In one embodiment, at a first network element in a packet-optical network topology performs a method that includes receiving advertisements from other network elements in the packet-optical network topology, the advertisements indicating local label/node mapping information of respective other network elements, wherein a local label serves as an optical circuit provisioning label of respective other network elements. The first network element updates a local label database with the local label/node mapping information received from the other network elements. The first network element receives from a second network element in the packet-optical network topology, a packet having a header that includes labels, and determines, based on the local label database at the first network element, whether a top label included in the header of the packet is an optical circuit provisioning label of another network element in the packet-optical network topology. The first network element identifies a destination node mapped to the optical circuit provisioning label of the packet, determines whether an optical circuit to the destination node has already been created for the optical circuit provisioning label, and dynamically creates the optical circuit to the destination node when it is determined that the optical circuit does not already exist. The first network element forwards traffic to the destination node over the optical circuit.

In another embodiment, a first network element in a packet-optical network topology performs a method that includes creating a list of all network elements in the packet-optical network topology, generating a local label for the first network element, the local label to be used as an optical circuit provisioning label, and advertising local label/node mapping information based on the local label to other network elements in the packet-optical network topology. The first network element determines an event for creation of a new routing policy, and creates the new routing policy that includes sending to a second network element a packet having a header including labels at least one of which indicates to the second network element to create an optical circuit in the packet-optical network topology.

EXAMPLE EMBODIMENTS

Techniques are presented herein that are useful in any converged packet-optical network. If the network is a mix of packet and optical networking equipment, these techniques can be used to dynamically/on-demand create optical circuit paths. These techniques take advantage of Segment Routing (SR) and create, on-the-fly, optical label switch paths (LSPs) within the network.

According to embodiments presented herein, SR labels are used to initiate optical LSPs on-the-fly. Currently, optical circuits are set up even if they are not in use, or may be used in the future. This is avoided, and instead, optical LSPs are only set up based on need. Information, such as header type and label type, is used in SR headers to initiate the optical circuit creation.

The embodiments presented herein are useful in connection with any converged packet-optical network, an example of which is a Routed Optical Network (RON). A RON employs a hop-by-hop architecture with perhaps more packet routers instead of more optical nodes, and with more higher bandwidth (e.g., 400G) links back-to-back. At each hop, one can add or drop services in the RON. The RON allows for use of more L3 (packet) devices because of cost efficiency, whereas optical links are used for shorter distances where higher bit rates can more easily be supported. Traffic offloading and aggregation capabilities are enabled in the transit hops of a RON.

Figure 1:
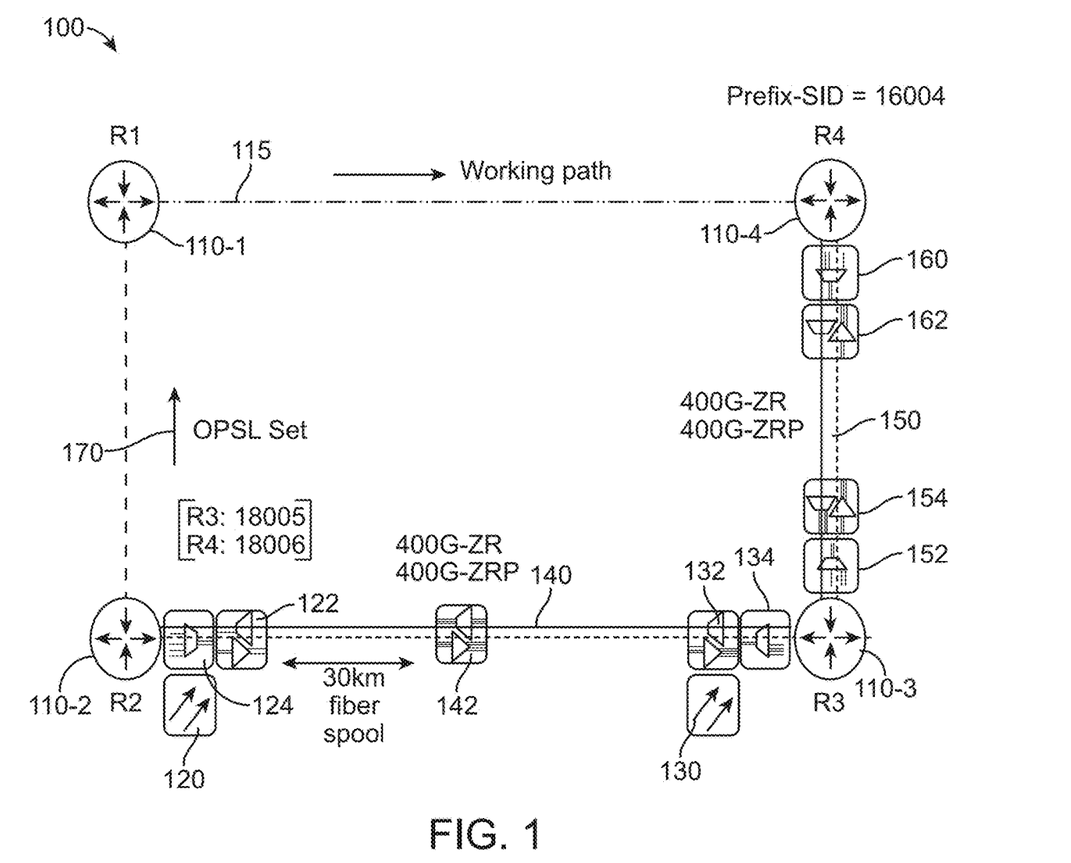
FIG. 1 is a block diagram of an example Routed Optical Network (RON) in which traffic is steered using Segment Routing (SR) techniques and an optical provisioning SR label (OPSL) is advertised in a packet-optical network, according to an example embodiment.

Referring first to FIG. 1, an example of a converged packet-optical network 100 is shown. The network 100 includes four network elements, called (routers), R1-R4, also denoted by reference numbers 110-1, 110-2, 110-3 and 110-4, respectively. There is a working path 115 between R1 and R4 over which services are running and SR is enabled between R1 and R4 and with R2 as well. Routers R1-R4 are packet-optical devices. There is an SR policy between R1 and R4 that consists of a label binding with the next hop R4. A Prefix-SID (Prefix Segment Identifier) is an identifier that labels a node. When R1 wants to send traffic to R4, R1 inserts the Prefix-SID of R4, 16004, into a header of a packet. This causes the traffic to be directed to R4. Traffic can be protected by a protection path. Sometimes, a protection path may not be available (rare cases).

R2 and R3 each have optical networking communication capabilities with each other. As an example, to support optical communication with router R3, router R2 includes a reconfigurable optical add/drop multiplexer (ROADM) 120, an Erbium Doped Fiber Amplifier (EDFA) 122 and a Dense Wavelength Division Multiplex (DWDM) passive optical multiplexer 124. Similarly, to support optical communication with router R2, router R3 includes a ROADM 130, an EDFA 132 and a DWDM passive optical multiplexer 134. There is a fiber span (including bi-directional fibers) 140 between nodes R2 and R3, with a Raman amplifier (EDRA) 142 deployed in the fiber span 140. R2 and R3 can support 400G-ZR and 400G-ZRP communication over fiber span 140. Similarly, R3 and R4 can support 400G-ZR and 400G-ZRP communication over fiber span 150.

Similarly, R3 and R4 have optical network communication capabilities with each other over a fiber span 150. Router R3 includes a DWDM passive optical multiplexer 152 and an EDFA 154, and router R4 includes a DWDM passive optical multiplexer 160 and EDFA 162.

In the topology of FIG. 1, there is no pre-established optical circuit/label switched path (LSP) between R2 and R4. R2 will instruct/announce to R1 (and to all the nodes in the network 100) that R2 has optical adjacency with R3 and virtual optical adjacency to R4 (via R3). For example, R2 sends to R1 (and to all the nodes in the network 100), the OPSL Set [R3:18005; R4:18006] shown at 170 indicating that R3 is an adjacent optical node to R2 and R4 is an adjacent optical node to R2 via R3. FIG. 1 shows control plane operations that allow R1, for example, to know what to include in a SR header to cause R2 to create an optical circuit.

Figure 2:
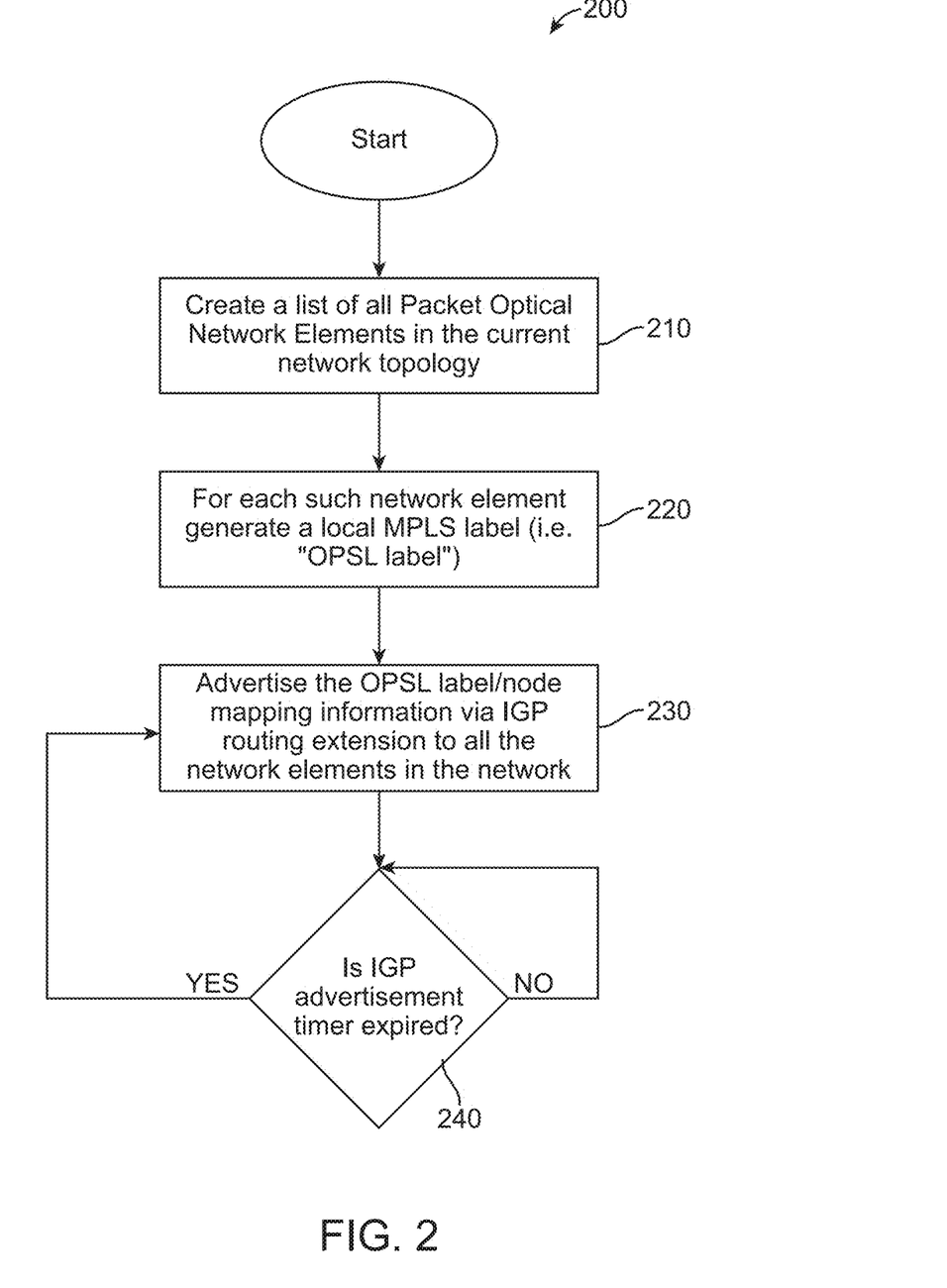
FIG. 2 is a flow chart depicting a process by which a network element may advertise an OPSL to other network elements in a packet-optical network, according to an example embodiment.

FIG. 2 shows a flow chart for a method 200 of OPSL label generation and advertisement. This method is performed by each network element/node in the network. In step 210, a given network element creates a list of all packet-optical network elements in the current network topology. In step 220, for each other network element, the given network generates a local Multi-Protocol Label Switched (MPLS) label, called an OPSL or OPSL label. At 220, the given node advertises the OPSL label/node mapping information using a suitable protocol, to all other network elements in the network. This label, when presented to another network element, will be interpreted/constructed to signify creation of an optical circuit to that network element.

The OPSL set is a mechanism to announce optical adjacencies to peer nodes in the network so that any other node can use information from the OPSL set to determine the appropriate label to use in order to create an optical circuit. For example, the Interior Gateway Protocol (IGP) may be used, and appropriate routing extensions are created/defined to support the OPSL label/node mapping information. An extension to the Intermediate System—Intermediate System (ISIS) protocol and Open Shortest Path First (OSPF) protocol may be useful for supporting this OPSL set advertisement within the IGP domain. For example, IETF RFC 8667 and 8665 define the existing mechanisms for the SR label distribution. These mechanisms may be extended by adding new Type Length Values (TLVs) for the OPSL SID referred to herein. In the example of FIG. 1, R2 allocates two local labels: 18005 for the optical adjacency with R3 and 18006 is for the adjacency with the node R4.

At step 240, it is determined with the advertisement timer has expired, and if so, then step 230 is repeated, to provide appropriate updates about any changes in the network. Thus, on a certain periodic basis, each network element may repeat the advertising step 230 to account for any updates that may have occurred since the previous update.

Figure 3:
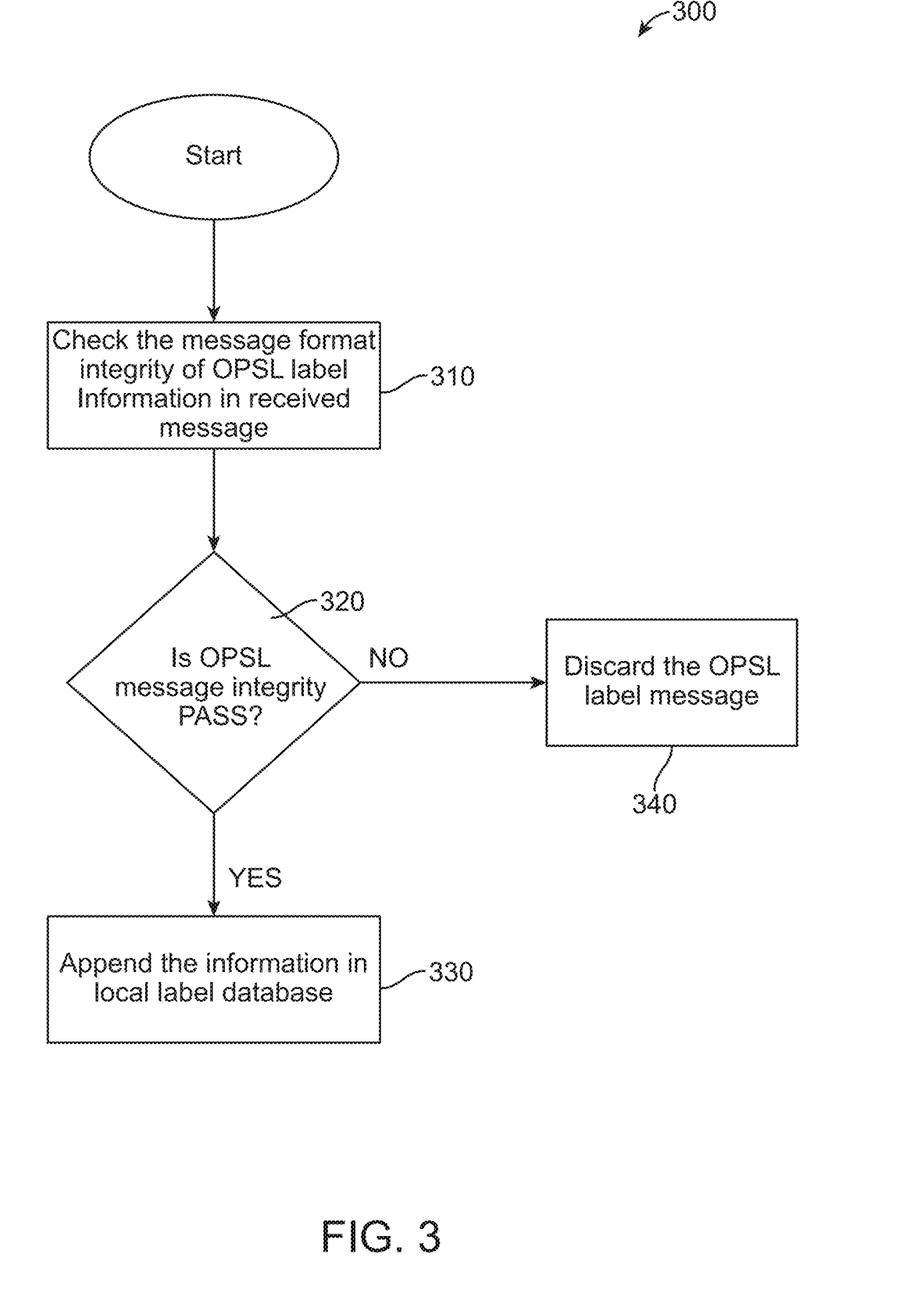
FIG. 3 is a flow chart of a process performed by a network element in receiving an OPSL advertised by other network elements in a packet-optical network, according to an example embodiment.

FIG. 3 shows a flow chart for a method 300 by which a node receives an OPSL and updates its local database. At step 310, the network element checks the message format integrity of OPSL label information included in a received message. In step 320, it is determined whether the OPSL message integrity check passes, and if so, then in step 330, the network element appends the information contained in the received message into its local label database. A local label database is local to each network element and maintains a mapping of an incoming label to an outgoing label/outgoing interface. An OPSL label/associated node pair will also be part of the same local label database. At 340, the received message is discarded if it is does not pass the integrity check in step 320.

Thus, each network element maintains a mapping, similar to label distribution protocol (LDP) mapping, where one label is associated with an outgoing interface. OPSL labels indicate optical adjacencies and the meaning of the labels.

For the example shown in FIG. 1, 16004 is the existing SR policy running on the direct hop path between R1 and R4. A SR policy represents a set of labels that is imposed for a given destination (R4 in this case). In this topology example, the label stack includes single label 16004. This label information is stored in the local label database. The sample entry for this label in the local label database at R1 may be:

| Label | Outgoing Interface |
|---|---|
| 16004 | Interface ID (at R1) of link between R1 and R4 |

Techniques are presented herein for scenarios of graceful make-before-break (MBB), re-optimization (soft switchover), or signaling a new backup path over an optical network. To this end, reference is now made to FIG. 4. Consider a situation in which re-optimization or graceful MBB is needed because the working path 115 is experiencing issues as shown at 400. R1 can send the label set {OPSL, Prefix- SID)={18006, 16004} to R2, as shown at 410. The label "18006" in the label set {18006, 16004} signifies that when R2 is to create an optical circuit 420 to from R2 to R4, such that when R2 subsequently receives any packet with the destination Prefix-SID 16004, R2 is going to send the packet over the optical circuit 420 from R2 to R4.

Figure 4:
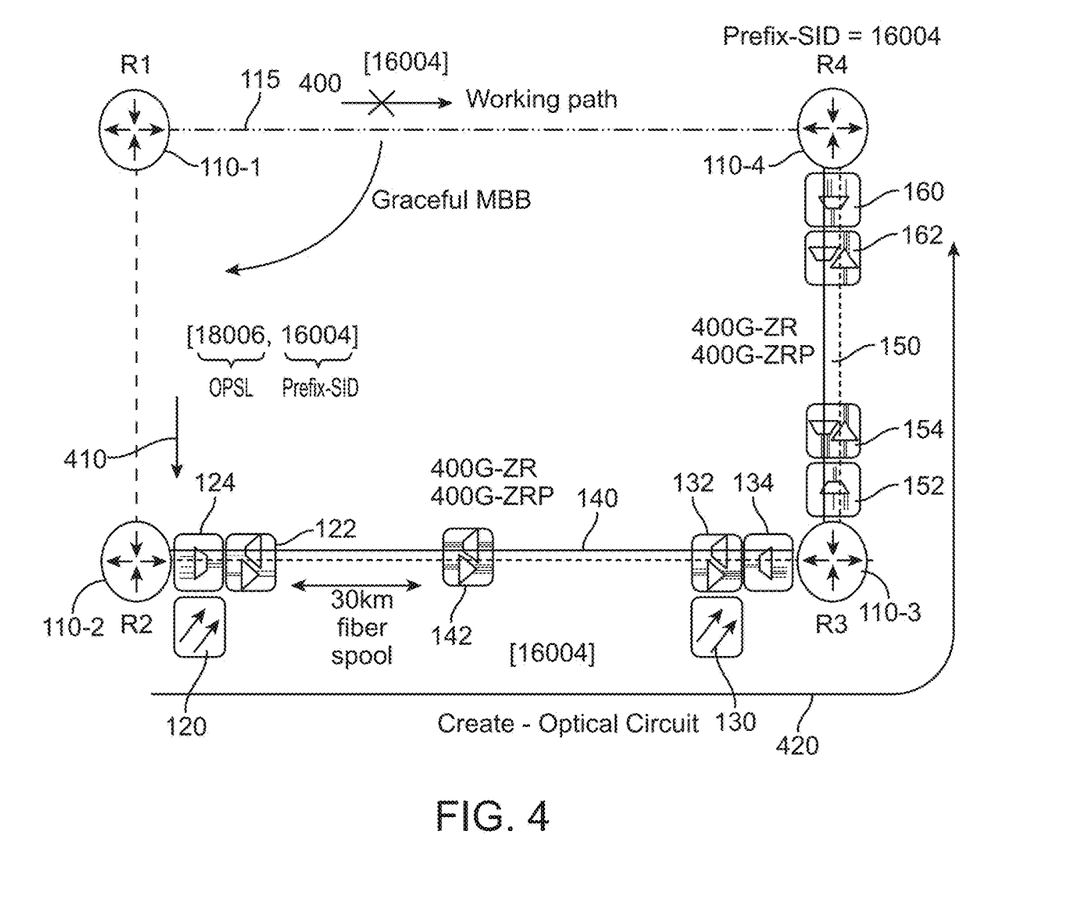
FIG. 4 is a diagram similar to FIG. 1, but illustrating use of an OPSL to dynamically create an optical circuit, according to an example embodiment.

OPSL, in the example of FIG. 4, the SR policy runs between R1 and R4 (over a longer path). The label stack includes [18006 (top label), 16004 (bottom label)]. The OPSL label 18006 is also be stored in the local label database. The sample entry for this label in local label database at R1 may be:

| Label | Outgoing Interface | OPSL Label router ID association |
|-------|--------------------|----------------------------------|
| 18006 | Interface ID (at R1) of link between R1 and R2 | R4 Node ID in Traffic Engineering topology database |

When R2 sees the label set {18006, 16004} for the first time, R2 will know that there is no optical circuit already created so R2 creates the optical circuit 420 as shown in FIG. 4. In one example using SR, the optical circuit creation flow is: SR Router1=>SR Router2=>UNI=>Optical. That is, SR R1 can send the circuit creation label to SR R2 which can understand the label instruction. R2 can initiate optical circuit creation with UNI signaling. In another example, the optical circuit creation flow is: SR Router1=>(MPLS aware packet port on) Optical. That is, an SR enabled port can coexist on the ROADM node itself.

At some time later, R1 will send a packet with the same 2 labels in order to forward traffic over that optical circuit so created. R2 will detect the same labels in SR header of the packet and know to map that traffic to that desired optical circuit. At that point, R2 will not need to create that optical circuit since it has already been created. The inner label, e.g., 16004, will indicate that the destination of the packet is R4. Thus, these techniques involve the OPSL instruction, e.g., as shown at 410, to create the circuit and then using the same labels for forwarding the packet carrying those labels when the optical circuit has been created.

The OPSL is not the same as an optical binding SID. In the case of a binding SID, a pre-established optical circuit is needed to steer the traffic over an optical circuit. In accordance with the techniques presented herein, there are no existing optical circuits to R3 or R4. The OPSL set serves as an instruction label that can be used to signal creation of a new optical circuit. A similar mechanism can be used if an existing backup path fails and a new backup path is needed. OPSL can be used to instruct R2 to create an optical path between R2 and R4.

When creating an optical circuit (e.g., LSP), there can be some delay in setting up the optical circuit, 1-2 minutes. R2 may notify R1 to hold off for one minute before sending traffic.

The mechanism depicted in FIG. 4 may also be used to set up a backup path, for example, between R1 and R4, to satisfy a need for more bandwidth on-demand for traffic between R1 and R4, to redirect traffic to do some repair on the working path 115. The techniques depicted in FIG. 4, in combination with the control plane operations depicted in FIGS. 1-3, allow for creating an optical circuit on-the-fly.

The techniques presented herein can also be used for bandwidth increase on-demand for a given active service. When an end user of a given service needs additional bandwidth, the techniques presented above can be used to trigger the additional optical LSP to the same destination.

Once the new optical LSP is setup, Equal Cost Multi-Path (ECMP) routing can also be done on the packet SR policy and the optical LSP together. In other words, a node can be configured to do ECMP Routing to select between a packet network path and an optical circuit path based on the hash computation performed at that node.

When employing ECMP, a hash is computed on SR policy information and the resulting hash is used to send that packet over the optical circuit that was just created. For example, R1 will program the outgoing label 16004 and egress interfaces towards R4, such as the direct link from R1 to R4 and maybe some other links. A second programming may be the egress interfaces (R1 and R2) and the outgoing label will be two labels (instead of one label). As a result, R1 can do load balancing of traffic destined to R4 onto interfaces to R4 directly or to R2. The path from R1 to R4 directly may be packet-based, as it is for R1 to R2. Optical forwarding starts at R2. Thus, these techniques may involve employing ECMP where one interface is to a packet network and another interface is to an optical path.

It may be desirable to split traffic unequally between one link and another link, e.g., between a packet-based link and an optical link. ECMP is usually performed to load balance equally, but the techniques presented herein allow for leveraging ECMP to split traffic volume unequally between two paths, for example, more of the traffic flow is sent over an optical link, if needed.

Figure 5:
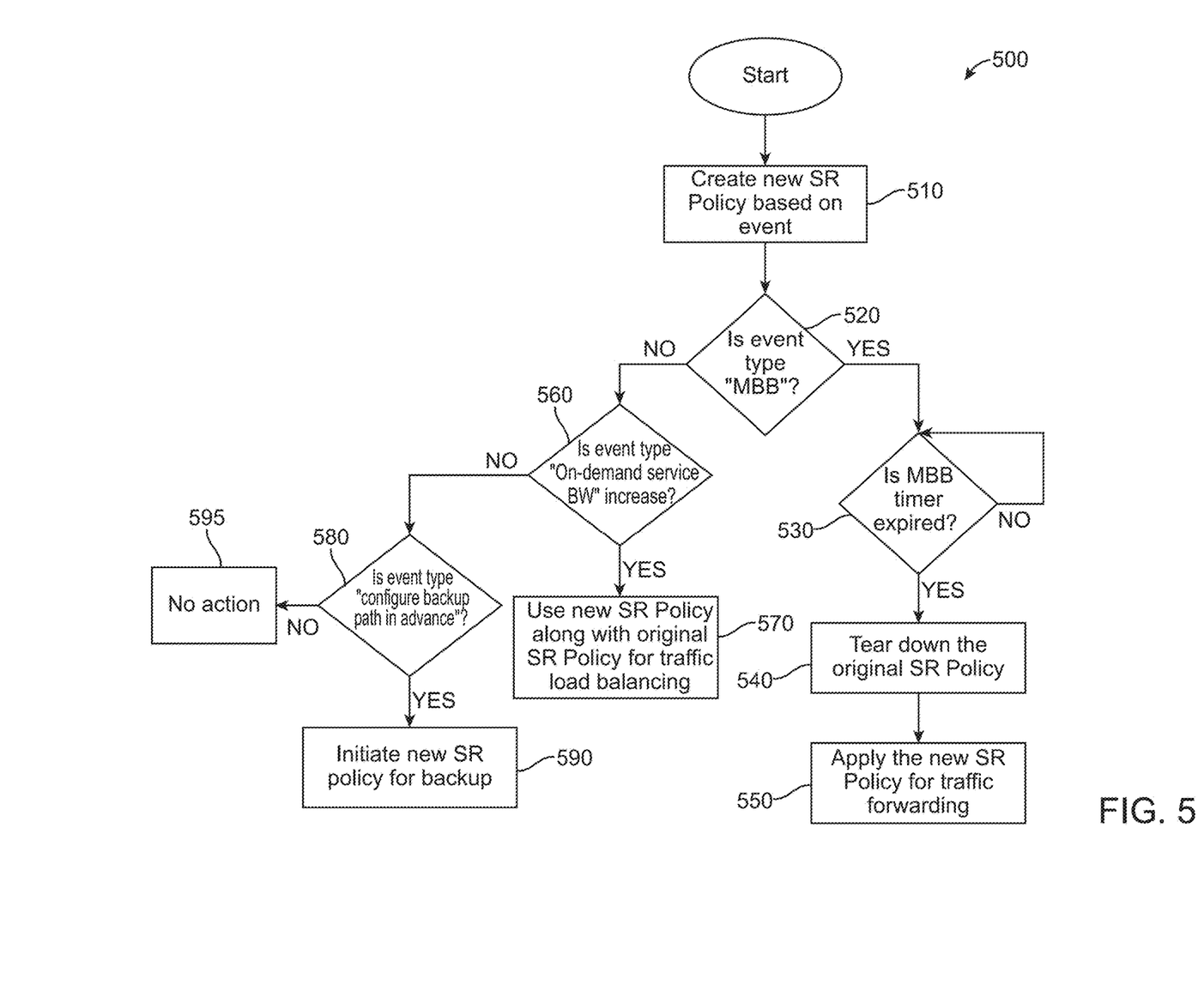
FIG. 5 is a flow chart depicting a process performed by a network element to generate an OPSL instruction for a new dynamic/on-demand SR policy to create an optical circuit, according to an example embodiment.

FIG. 5 illustrates a flow chart of a process 500 performed by a network element to generate an OPSL instruction for a new dynamic/on-demand SR policy. The new SR policy is created based on the associated event. At 510, a new SR policy is created based on an event.

At 520, it is determined whether the event is an MBB type event, then after the MBB timer has expired at 530, at 540, the network element tears down the original SR policy and applies a new SR policy for traffic forwarding at 550.

If, at 560, it is determined that the event is an "on-demand service bandwidth (BW)" increase event, then at 570 the new SR policy is used, together with the original SR policy, to perform traffic load balancing.

If is determined at 580 that the event is a backup path configuration, then the network element initiates a new SR policy for backup path creation at 590.

If the outcome of the determination at 580 is negative, then no action is taken at 595.

Figure 6:
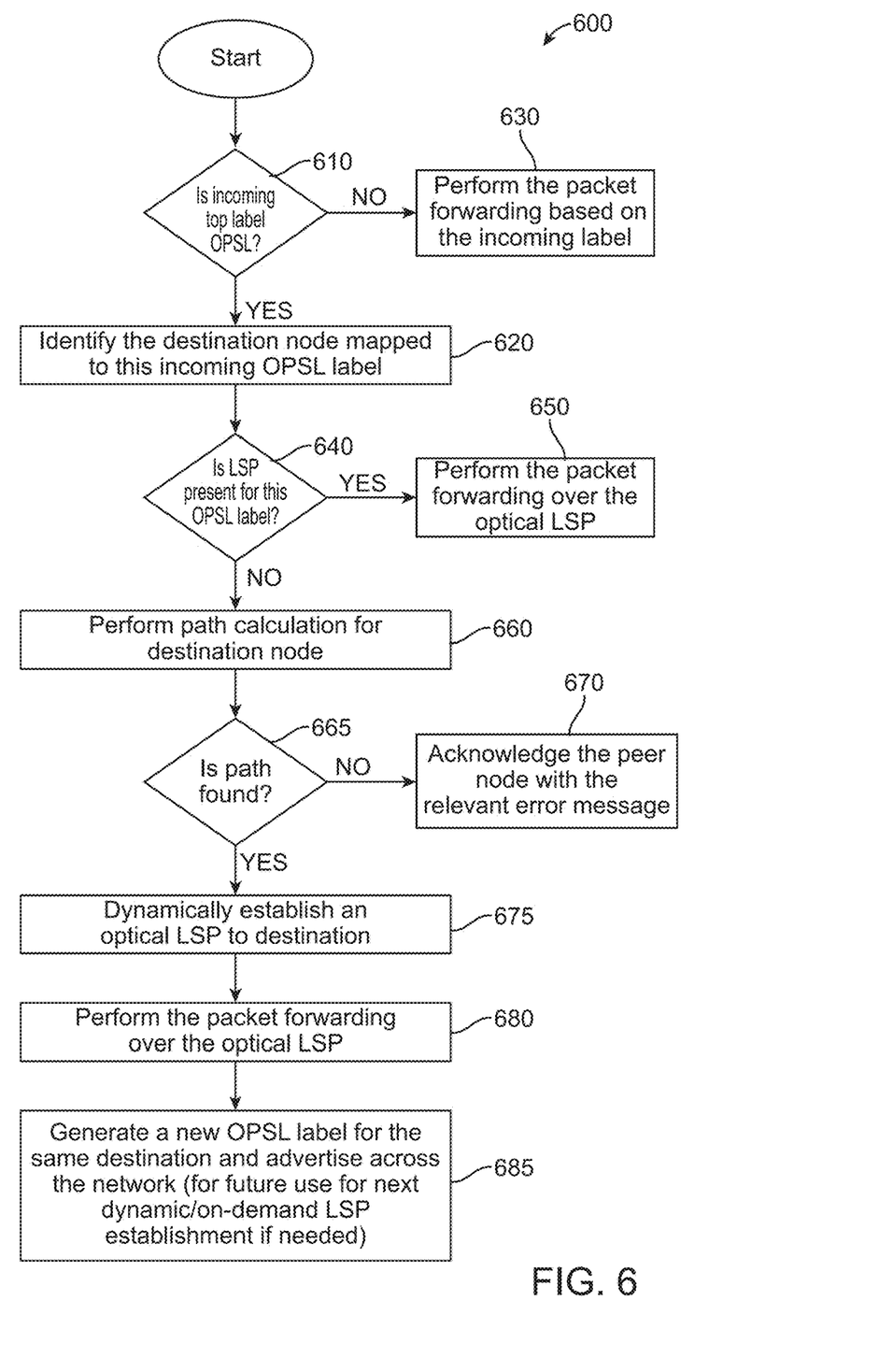
FIG. 6 is a flow chart depicting a process performed by a network element to receive and act on an OPSL instruction for a dynamic/on-demand SR policy to create an optical circuit, according to an example embodiment.

FIG. 6 is a flow chart of a process 600 performed by a network element upon receiving an OPSL instruction for a dynamic/on-demand SR policy. At 610, the network element evaluates the top label in the SR header of an incoming packet to determine it is an OPSL. This was explained above in connection with FIG. 4, where the label "18006" is interpreted as an OPSL.

When the incoming top label is an OPSL, then at 620 the network element identifies the destination node mapped to the incoming OPSL label. The operation 620 is determined based on the mapping information maintained by the network element as described above in connection with FIG. 3. If the top label of the incoming packet is not an OPSL, then at 630, the network element performs packet forwarding based on the incoming packet as it normally would using SR techniques.

Next, at 640, the network element determines whether the LSP (optical circuit) is present for the OPSL instructions. If the LSP (optical circuit) is already present, then at 650 the network element forwards the packet over the LSP.

On the other hand, if the LSP (optical circuit) is not already present for the OPSL instruction, then at 660 the network element performs a path calculation for the destination node. The path computation logic may use the same techniques as those used in GMPLS (Generalized-MPLS)/WSON (Wavelength Switched Optical Network)-based control plane networks. At 665, it is determined whether the path calculated at 660 is found. If the path determined by the path calculation is not found, then at 670 the network element notifies the peer node with an error message.

Otherwise, if the path is found, then at 675, the network element dynamically establishes an LSP (optical circuit) to the destination, using the techniques described above in connection with FIG. 4. Dynamic establishment of a LSP (optical circuit) may involve GMPLS signaling to establish an optical path across an identified set of optical nodes. At the individual optical network element level, this involves creating a wavelength cross-connect to open an end-to-end optical channel. At 680, the network element performs packet forwarding over the LSP (optical circuit). Next, at 685, the network element generates a new OPSL label for the same destination and advertises it across the network (for future use for next dynamic/on-demand LSP establishment, if needed).

Figure 7:
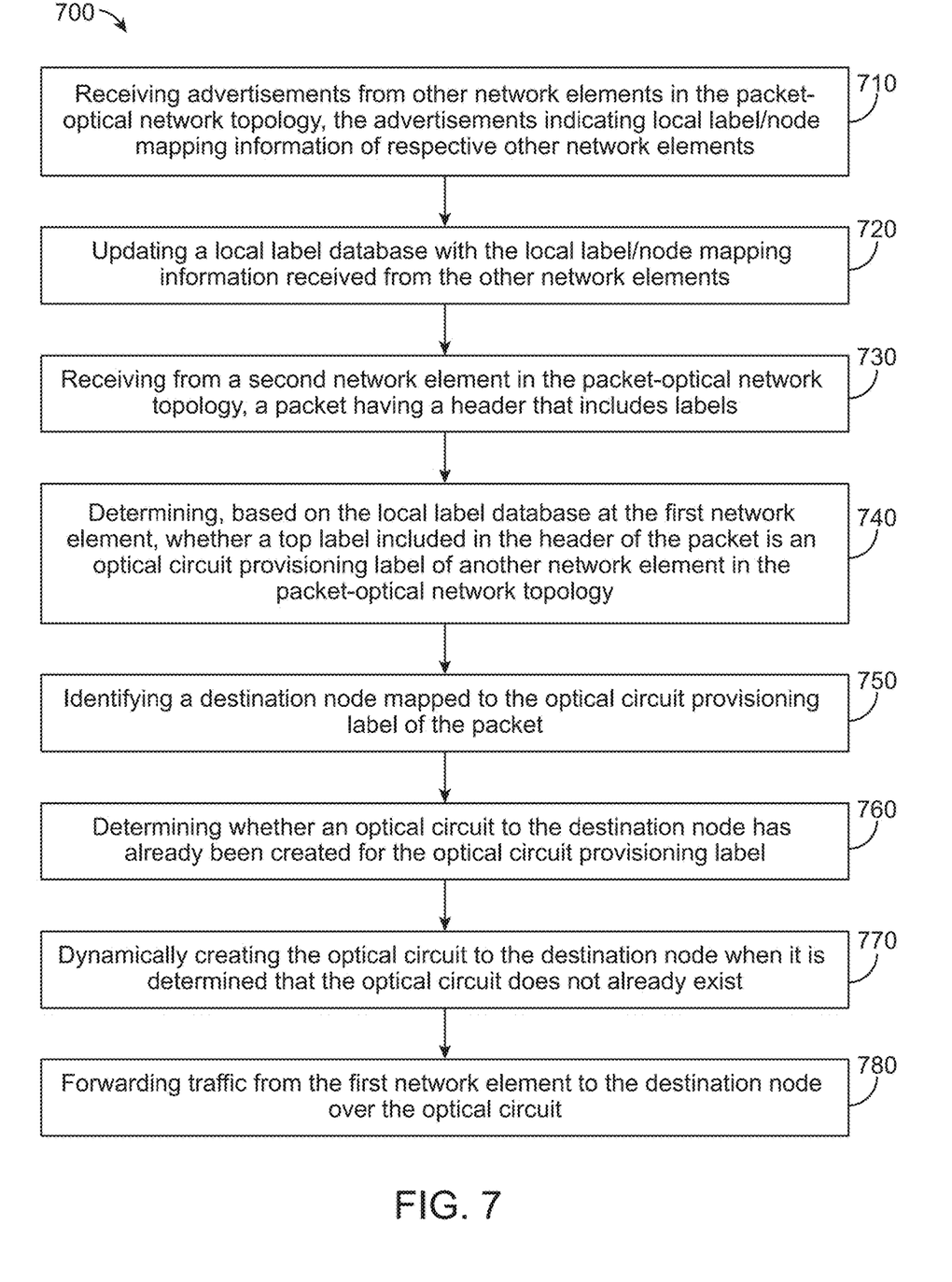
FIG. 7 is a flow chart depicting operations of a method performed by a network element that has received an OPSL from another network element to create an optical circuit, in accordance with an example embodiment.

Reference is now made to FIG. 7, which shows a flow chart for a method 700 that is performed by a network element that has received an OPSL from another network element to create an optical circuit, such as node R2 that has received an OPSL from R1 in example of FIG. 4. Thus, the method 700 is performed by an arbitrary first network element in a packet-optical network topology. The method 700 includes, at step 710, at a first network element in a packet-optical network topology, receiving advertisements from other network elements in the packet-optical network topology, the advertisements indicating local label/node mapping information of respective other network elements. A local label serves as an optical circuit provisioning label of respective other network elements. Next, at step 720, the method 700 includes updating a local label database with the local label/node mapping information received from the other network elements. At step 730, the method 700 includes receiving from an arbitrary second network element in the packet-optical network topology, a packet having a header that includes labels, and at 740, determining, based on the local label database at the first network element, whether a top label included in the header of the packet is an optical circuit provisioning label of another network element in the packet-optical network topology. In one example, the header of the packet is a Segment Routing (SR) header.

At step 750, the method includes identifying a destination node mapped to the optical circuit provisioning label of the packet, and at 760, determining whether an optical circuit to the destination node has already been created for the optical circuit provisioning label. At 770, the method includes dynamically creating the optical circuit to the destination node when it is determined that the optical circuit does not already exist. At 780, the method includes forwarding traffic from the first network element to the destination node over the optical circuit.

In the method 700, when it is determined at step 760 that the optical circuit to the destination node has not already been created, the method includes performing a path calculation for the destination node. Further, the step 770 of dynamically creating the optical circuit is based on results of the path calculation.

As described above, forwarding traffic (at step 780) may include performing an Equal Cost Multi-Path (ECMP) hash computation based on labels contained in the SR header of packets to be sent out from the first network element to select between the optical circuit or a packet-based path in the packet-optical network topology.

The method 700 may further include: generating a new optical circuit provisioning label for the destination node; and advertising the new optical circuit provisioning label to other network elements in the packet-optical network topology. Further still, the method 700 may include: creating a list of all network elements in the packet-optical network topology; generating a local label for the first network element, the local label to be used as an optical circuit provisioning label; and advertising local label/node mapping information based on the local label to other network elements in the packet-optical network topology.

Figure 8:
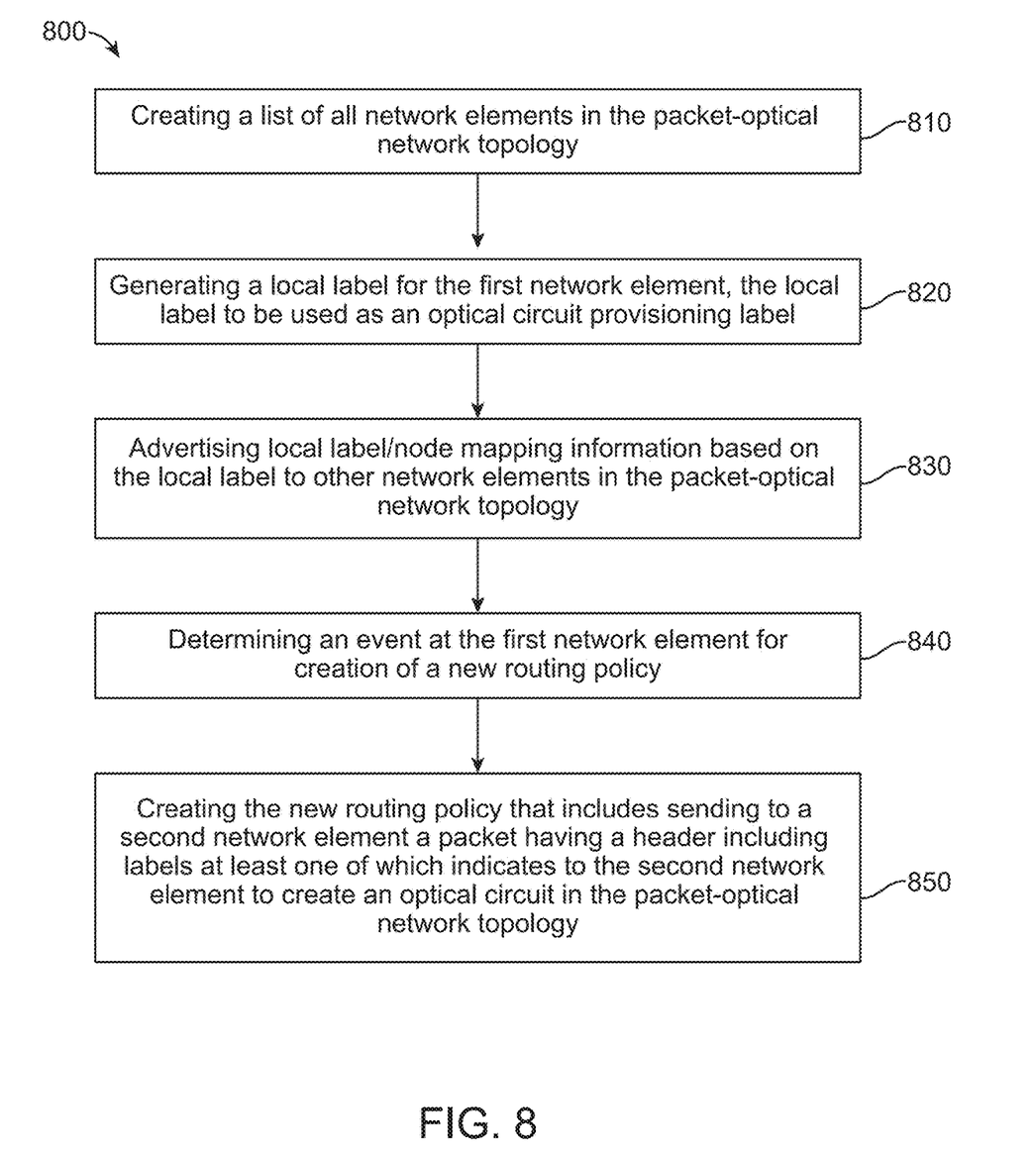
FIG. 8 is a flow chart depicting operations of a method performed by a network element to send an OPSL to another network element to cause that other network element to create an optical circuit, in accordance with an example embodiment.

Reference is now made to FIG. 8, which illustrates a flow chart for a method 800 that is performed by a network element, e.g., R1 in FIG. 4, which sends an OPSL to another network element, e.g., R2 in FIG. 4, to cause that other network element to create an optical circuit. The method 800 is performed by an arbitrary first network element in a packet-optical network. At step 810, the method includes creating a list of all network elements in the packet-optical network topology. At step 820, the method includes generating a local label for the first network element, the local label to be used as an optical circuit provisioning label, and at step 830, advertising local label/node mapping information based on the local label to other network elements in the packet-optical network topology.

At step 840, the method includes determining an event at the first network element for creation of a new routing policy, and at step 850, creating the new routing policy that includes sending to a second network element a packet having a header including labels at least one of which indicates to the second network element to create an optical circuit in the packet-optical network topology.

In the method 800, the step 850 of creating the new routing policy may include providing in the header of the packet, an optical circuit provisioning label indicating a third network element as a destination node for an optical circuit in the packet-optical network topology that causes the second network element to dynamically create the optical circuit to the third network element.

The method 800 may further include: receiving advertisements from other network elements in the packet-optical network topology, the advertisements indicating local label/node mapping information of respective other network elements, wherein the local label serves as an optical circuit provisioning label of respective other network elements; and updating a local label database with the local label/node mapping information received from the other network elements. The step 850 of creating the new routing policy may include determining the optical circuit provisioning label of the third network element based on the local label database at the first network element.

When the event is a make-before-break switchover, the method 800 may further include: tearing down an existing routing policy used for traffic forwarding; and applying the new routing policy for traffic forwarding. When the event is an on-demand service bandwidth increase, the method 800 may further include: performing traffic forwarding with load balancing using an existing routing policy and the new routing policy. When the event is a backup path configuration, the method 800 may further include: initiating the new routing policy for a backup path.

Figure 9:
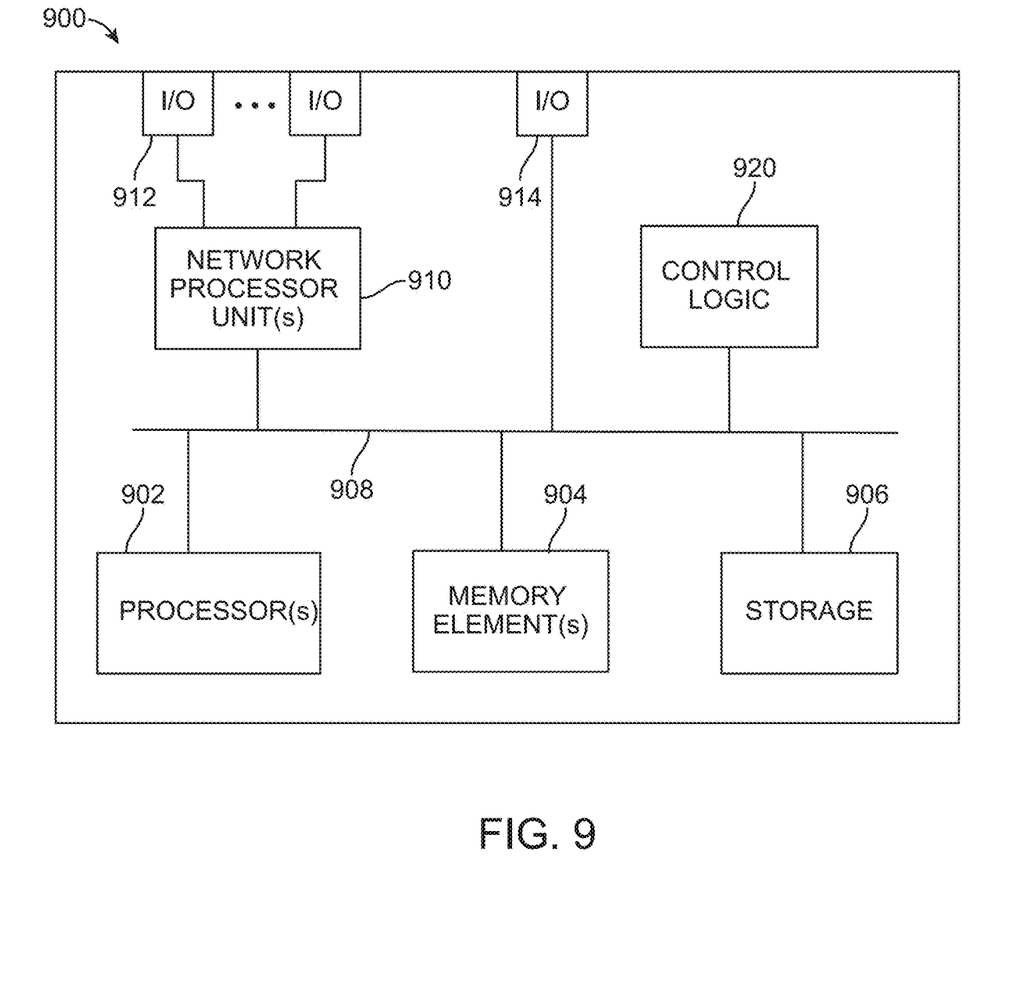
FIG. 9 is a hardware block diagram of a network element configured to perform the techniques presented herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises, at a first network element in a packet-optical network topology: receiving advertisements from other network elements in the packet-optical network topology, the advertisements indicating local label/node mapping information of respective other network elements, wherein a local label serves as an optical circuit provisioning label of respective other network elements; updating a local label database with the local label/node mapping information received from the other network elements; receiving from a second network element in the packet-optical network topology, a packet having a header that includes labels; determining, based on the local label database at the first network element, whether a top label included in the header of the packet is an optical circuit provisioning label of another network element in the packet-optical network topology; identifying a destination node mapped to the optical circuit provisioning label of the packet; determining whether an optical circuit to the destination node has already been created for the optical circuit provisioning label; dynamically creating the optical circuit to the destination node when it is determined that the optical circuit does not already exist; and forwarding traffic from the first network element to the destination node over the optical circuit.

In another form, a method is provided comprising, at a first network element in a packet-optical network topology: creating a list of all network elements in the packet-optical network topology; generating a local label for the first network element, the local label to be used as an optical circuit provisioning label; advertising local label/node mapping information based on the local label to other network elements in the packet-optical network topology; determining an event at the first network element for creation of a new routing policy; and creating the new routing policy that includes sending to a second network element a packet having a header including labels at least one of which indicates to the second network element to create an optical circuit in the packet-optical network topology.

In still other forms, an apparatus may be provided that is configured to perform the methods presented herein. For example, an apparatus is provided that comprises: a network interface configured to enable communications over a packet-optical network topology; a memory configured to store data representing a local label database; and a processor coupled to the network interface and to the memory, and configured to perform operations including: receiving advertisements from other network elements in the packet-optical network topology, the advertisements indicating local label/node mapping information of respective other network elements, wherein a local label serves as an optical circuit provisioning label of respective other network elements; updating the local label database stored in the memory with the local label/node mapping information received from the other network elements; receiving from a second network element in the packet-optical network topology, a packet having a header that includes labels; determining, based on the local label database stored in the memory, whether a top label included in the header of the packet is an optical circuit provisioning label of another network element in the packet-optical network topology; identifying a destination node mapped to the optical circuit provisioning label of the packet; determining whether an optical circuit to the destination node has already been created for the optical circuit provisioning label; and dynamically creating the optical circuit to the destination node when it is determined that the optical circuit does not already exist.

In still further forms, the methods presented herein may be embodied in one or more non-transitory computer readable media encoded with software instructions that, when executed by a processor of a network element, cause the network element to perform the operations of the various methods presented herein.

As described above, the techniques presented herein may be used for graceful MBB, re-optimization of path or signaling a new backup path via optical LSP. In the case of graceful MBB, the working packet SR policy will not be torn down unless a new optical LSP is set up successfully. The head node can insert the optical LSP setup instruction label towards the peer node(s) along the new planned optical path. These techniques can also be used for bandwidth increase on-demand for a given active service. In this case, the end user of a given service needs additional bandwidth, and these techniques can be used to trigger the additional optical LSP to the same destination. Once the new optical LSP is setup, ECMP can also be done on the packet SR policy and the optical LSP together. Doing ECMP on packet SR policy and optical LSP together fits in the multi-layer software-defined networking approach.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a first network element in a packet-optical network topology:
    receiving advertisements from other network elements in the packet-optical network topology, the advertisements indicating local label/node mapping information of respective other network elements, wherein a local label serves as an optical circuit provisioning label of respective other network elements;
    updating a local label database with the local label/node mapping information received from the other network elements;
    receiving from a second network element in the packet-optical network topology, a packet having a header that includes labels;
    determining, based on the local label database at the first network element, whether a top label included in the header of the packet is an optical circuit provisioning label of another network element in the packet-optical network topology;
identifying a destination node mapped to the optical circuit provisioning label of the packet;
determining whether an optical circuit to the destination node has already been created for the optical circuit provisioning label;
dynamically creating the optical circuit to the destination node when it is determined that the optical circuit does not already exist; and
forwarding traffic from the first network element to the destination node over the optical circuit.

2. The method of claim 1, when it is determined that the optical circuit to the destination node has not already been created, performing a path calculation for the destination node, and wherein dynamically creating the optical circuit is based on results of the path calculation.

3. The method of claim 1, wherein the header of the packet is a Segment Routing (SR) header.

4. The method of claim 1, wherein forwarding traffic includes performing an Equal Cost Multi-Path (ECMP) hash computation based on labels contained in the header of packets to be sent out from the first network element to select between the optical circuit or a packet-based path in the packet-optical network topology.

5. The method of claim 1, further comprising:
generating a new optical circuit provisioning label for the destination node; and
advertising the new optical circuit provisioning label to other network elements in the packet-optical network topology.

6. The method of claim 1, further comprising:
creating a list of all network elements in the packet-optical network topology;
generating a local label for the first network element, the local label to be used as an optical circuit provisioning label; and
advertising local label/node mapping information based on the local label to other network elements in the packet-optical network topology.

7. A method comprising:
at a first network element in a packet-optical network topology:
creating a list of all network elements in the packet-optical network topology;
generating a local label for the first network element, the local label to be used as an optical circuit provisioning label;
advertising local label/node mapping information based on the local label to other network elements in the packet-optical network topology;
determining an event at the first network element for creation of a new routing policy; and
creating the new routing policy that includes sending to a second network element a packet having a header including labels at least one of which indicates to the second network element to create an optical circuit in the packet-optical network topology.

8. The method of claim 7, wherein creating the new routing policy includes providing in the header of the packet an optical circuit provisioning label indicating a third network element as a destination node for an optical circuit in the packet-optical network topology that causes the second network element to dynamically create the optical circuit to the third network element.

9. The method of claim 8, further comprising:
receiving advertisements from other network elements in the packet-optical network topology, the advertisements indicating local label/node mapping information of respective other network elements, wherein the local label serves as an optical circuit provisioning label of respective other network elements; and
updating a local label database with the local label/node mapping information received from the other network elements;
wherein creating the new routing policy includes determining the optical circuit provisioning label of the third network element based on the local label database at the first network element.

10. The method of claim 7, wherein when the event is a make-before-break switchover, further comprising:
tearing down an existing routing policy used for traffic forwarding; and
applying the new routing policy for traffic forwarding.

11. The method of claim 7, wherein when the event is an on-demand service bandwidth increase, further comprising:
performing traffic forwarding with load balancing using an existing routing policy and the new routing policy.

12. The method of claim 7, wherein when the event is a backup path configuration, further comprising:
initiating the new routing policy for a backup path.

13. The method of claim 7, wherein the header of the packet is a Segment Routing (SR) header and the new routing policy is an SR policy.

14. An apparatus comprising:
a network interface configured to enable communications over a packet-optical network topology;
a memory configured to store data representing a local label database; and
a processor coupled to the network interface and to the memory, and configured to perform operations including:
receiving advertisements from other network elements in the packet-optical network topology, the advertisements indicating local label/node mapping information of respective other network elements, wherein a local label serves as an optical circuit provisioning label of respective other network elements;
updating the local label database stored in the memory with the local label/node mapping information received from the other network elements;
receiving from a second network element in the packet-optical network topology, a packet having a header that includes labels;
determining, based on the local label database stored in the memory, whether a top label included in the header of the packet is an optical circuit provisioning label of another network element in the packet-optical network topology;
identifying a destination node mapped to the optical circuit provisioning label of the packet;
determining whether an optical circuit to the destination node has already been created for the optical circuit provisioning label; and
dynamically creating the optical circuit to the destination node when it is determined that the optical circuit does not already exist.

15. The apparatus of claim 14, wherein the processor is further configured to perform forwarding traffic to the destination node over the optical circuit.

16. The apparatus of claim 14, wherein the processor is further configured to perform a path calculation for the destination node when it is determined that the optical circuit to the destination node has not already been created, and the processor performs dynamically creating the optical circuit is based on results of the path calculation.

17. The apparatus of claim 14, wherein the processor is configured to perform an Equal Cost Multi-Path (ECMP) hash computation based on labels contained in the header of packets to be sent out via the network interface to select between the optical circuit or a packet-based path in the packet-optical network topology.

18. The apparatus of claim 14, wherein the processor is further configured to perform operations including:
- generating a new optical circuit provisioning label for the destination node; and
- advertising the new optical circuit provisioning label to other network elements in the packet-optical network topology.

19. The apparatus of claim 14, wherein the processor is further configured to perform operations including:
- creating a list of all network elements in the packet-optical network topology;
- generating a local label for the apparatus, the local label to be used as an optical circuit provisioning label; and
- advertising local label/node mapping information based on the local label to other network elements in the packet-optical network topology.

20. The apparatus of claim 14, wherein the header of the packet is a Segment Routing (SR) header.

* * * * *